Sept. 18, 1956 E. E. CATON ET AL 2,763,059
MANUFACTURE OF CARBON INSERT BRAKE SHOES
Filed Aug. 12, 1953 4 Sheets-Sheet 1
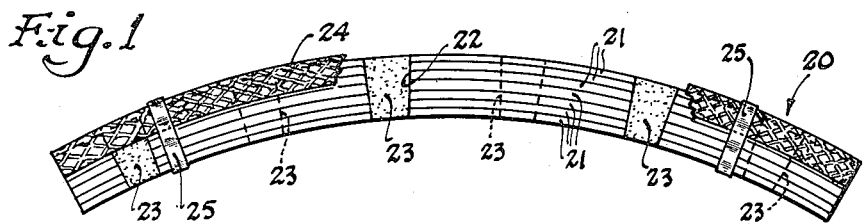
Fig. 1
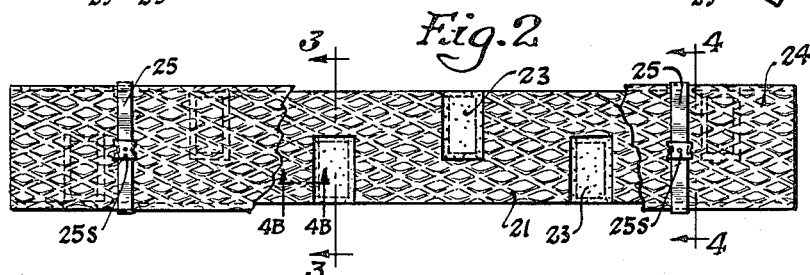
Fig. 2
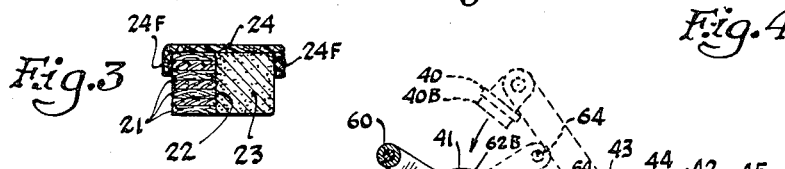
Fig. 3
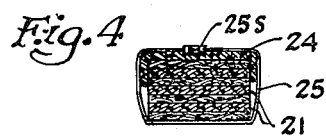
Fig. 4
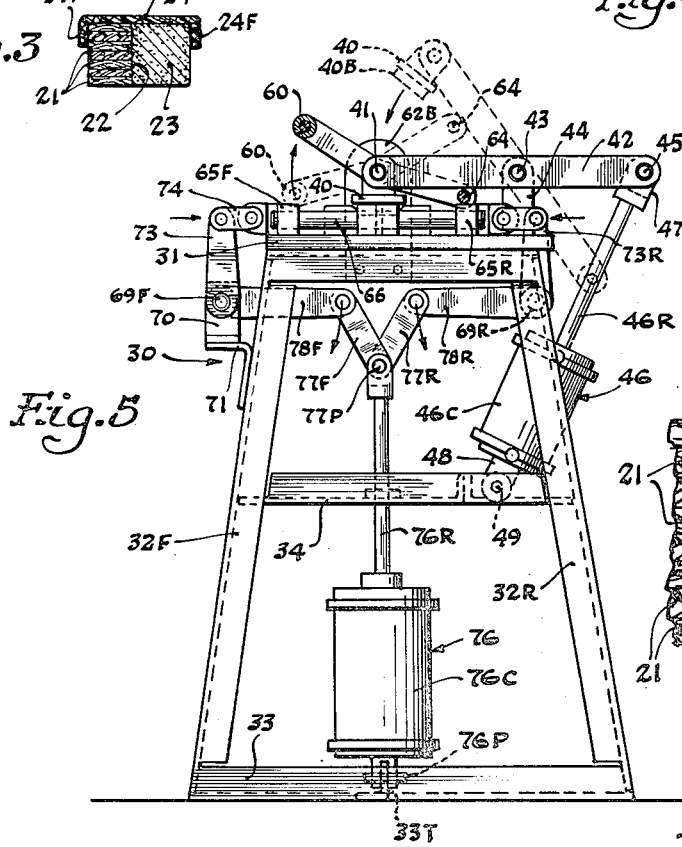
Fig. 5
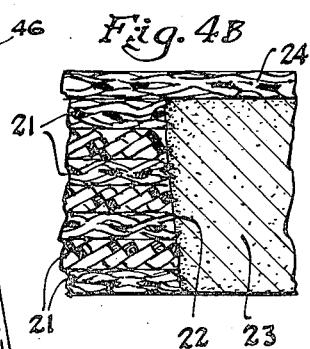
Fig. 4A
Fig. 4B
Inventors
Elmer E. Caton
Michael Salak
By Wallace and Cannon
Attorneys

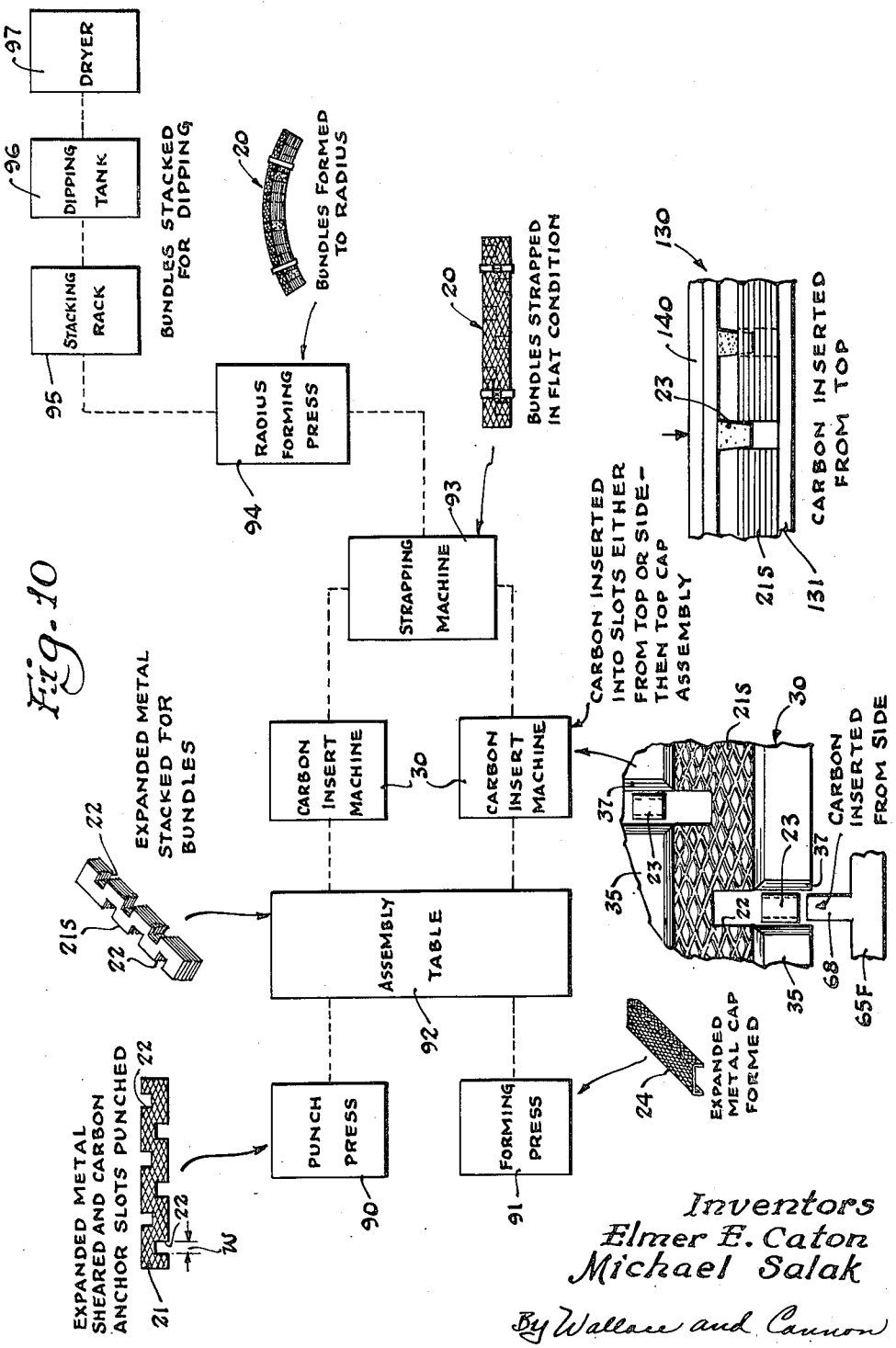

Sept. 18, 1956  E. E. CATON ET AL  2,763,059
MANUFACTURE OF CARBON INSERT BRAKE SHOES
Filed Aug. 12, 1953  4 Sheets-Sheet 4
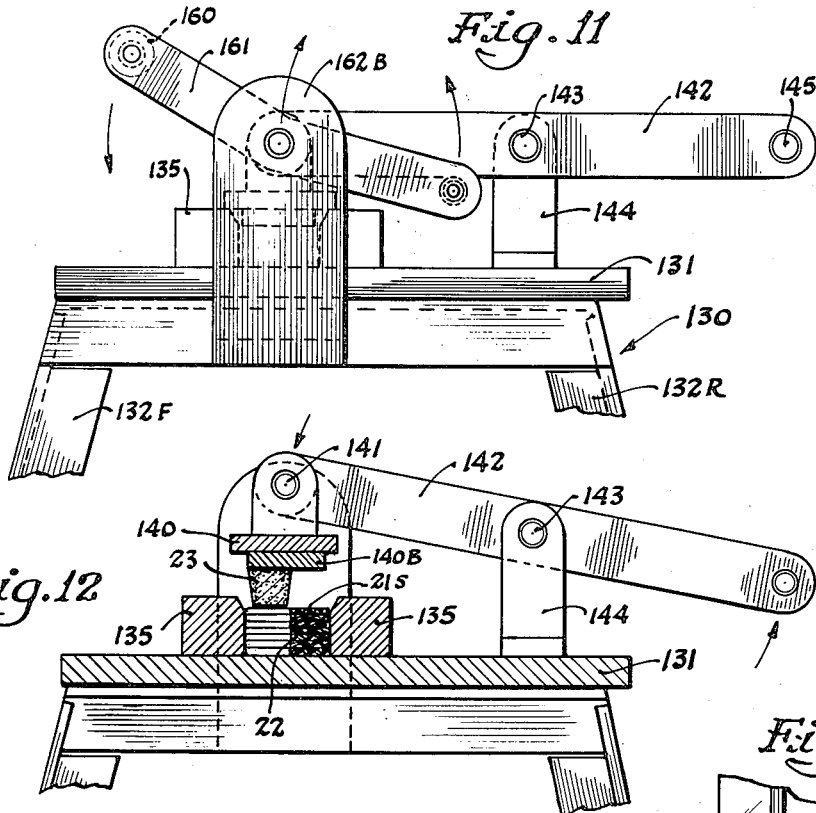
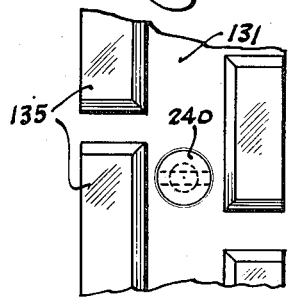
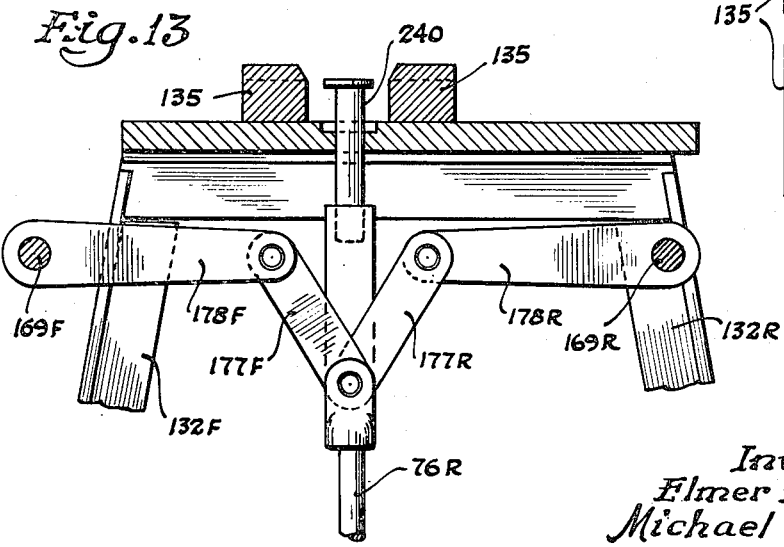
Inventors
Elmer E. Caton
Michael Salak
By Wallace and Cannon
Attorneys United States Patent Office 2,763,059
Patented Sept. 18, 1956

2,763,059

MANUFACTURE OF CARBON INSERT BRAKE SHOES

Elmer E. Caton, Pearl River, and Michael Salak, Spring Valley, N. Y., assignors to American Brake Shoe Company, New York, N. Y., a corporation of Delaware Application August 12, 1953, Serial No. 373,707

17 Claims. (Cl. 29—525)

This invention relates to the manufacture of railway brake shoes and particularly to the manufacture of such shoes that embody inserts or blocks of material such as carbon for modifying the friction characteristics of such shoes.

In the Rosser L. Wilson Patents No. 2,162,770 patented June 20, 1939 and No. 2,215,572 patented September 24, 1940, different forms of carbon insert railway brake shoes are disclosed in which expanded metal reinforcing units or bundles that are to be cast in the cast iron body of the brake shoe have carbon insert blocks mounted in cut-out openings in the stack of sheets of expanded metal that constitute the reinforcing means of the shoe. These carbon insert blocks, as explained in the aforesaid patents, function in the use of aforesaid railway brake shoes to modify and materially improve the friction characteristics of the brake shoes in use, and such carbon insert brake shoes have enjoyed an increasingly wide field of use in the railway industry. The manufacturing process and techniques heretofore employed in producing such carbon insert railway brake shoes have, however, been relatively expensive in that the assembly of the expanded metal reinforcing bundles with the carbon insert blocks has been performed as one of the steps in the mold making department of the foundry in which such shoes were to be cast.

In view of the expensive and time-consuming characteristics of such prior manufacturing operations, it is the primary object of the present invention to simplify and improve the manufacturing process and techniques involved in the producing of carbon insert brake shoes of the general character disclosed in the aforesaid Wilson patents. More specifically, it is an object of the present invention to enable the reinforcing bundles to be assembled with the carbon insert blocks at a remote location with respect to the foundry in which the brake shoes are to be cast, and more particularly it is an object to enable the carbon insert blocks to be associated with the expanded metal reinforcing bundles in such a way that these inserts will retain the desired positioning in the bundles while being handled and shipped or otherwise transported to the foundry in which such bundles are to be utilized.

Other and more specific objects of the present invention are to enable the carbon insert blocks to be placed in position in the reinforcing bundles in a simple and effective manner, to enable the placement of the carbon insert blocks in the bundles to be accomplished with the minimum amount of physical labor and to enable this to be accomplished by a positive positioning means which insure that the reinforcing bundles will be uniform and of high quality in each instance. Other and more specific objects are to provide a machine for inserting carbon insert blocks into the reinforcing bundles and to properly locate and relate the expanded metal elements of such bundles, as well as the carbon insert blocks that are to be placed in such bundles.

Other and further objects of the present invention will be apparent from the following description and claims and are illustrated in the accompanying drawings which, by way of illustration, show the preferred embodiments of the present invention and the principles thereof and what we now consider to be the best mode in which we have contemplated applying these principles. Other embodiments of the invention embodying the same or equivalent principles may be used and structural changes may be made as desired by those skilled in the art without departing from the present invention and the purview of the appended claims.

In the drawings:

Fig. 1 is a side elevational view of a carbon insert reinforcing bundle adapted to be utilized in producing carbon insert railway brake shoes, and which bundle embodies and is produced under the present invention;

Fig. 2 is a plan view of the reinforcing bundle shown in Fig. 1;

Figs. 3 and 4 are transverse sectional views taken substantially along the lines 3—3 and 4—4 of Fig. 2;

Fig. 4A is a perspective view showing one of the carbon insert blocks utilized in the reinforcing bundles shown in Figs. 1 to 4;

Fig. 4B is an enlarged fragmentary sectional view taken substantially along the line 4B—4B of Fig. 1;

Fig. 5 is an end elevational view of an assembling machine embodying the features of the present invention;

Fig. 6 is a plan view of the machine with the upper clamping head removed to show details of the work holding table;

Fig. 7 is a plan view similar to Fig. 6 but showing the upper work clamping head in place and having other structural members removed for purposes of clarity;

Fig. 8 is a front elevational view of the machine;

Fig. 9 is a fragmentary end elevational view showing the work clamping head in clamped position;

Fig. 10 is a schematic block diagram illustrating the manufacturing process of the present invention;

Fig. 11 is a fragmentary end elevational view illustrating an alternative embodiment of the assembling machine of the invention;

Fig. 12 is a transverse sectional view of the machine shown in Fig. 11;

Fig. 13 is a transverse sectional view illustrating an ejector mechanism embodied in the machine of Figs. 11 and 12; and Fig. 14 is a fragmentary plan view of part of the work supporting table.

In Figs. 1 to 4, 4A and 4B of the drawings, a carbon insert reinforcing bundle 20 is illustrated that is made in accordance with the present invention and which may be assembled by the machine and process of the present invention. This carbon insert reinforcing bundle 20 is of the general character illustrated in the aforesaid Wilson patents, and comprises a plurality of reinforcing layers 21 formed from expanded metal and having a plurality of sets of aligned mounting openings 22 formed therein to receive and position a plurality of carbon insert blocks 23 that are distributed at spaced points throughout the bundle so as to extend from top to bottom through the several reinforcing layers 21 and to be exposed at their lower ends at the lower face of the bundle. The several reinforcing layers 21 are formed from conventional expanded sheet metal that affords a diamond-shaped mesh as will be evident particularly in Fig. 2 of the drawings, and in accordance with the usual practice, these reinforcing layers 21 are so cut and formed that alternate layers are arranged with the major axis of the diamonds extending at right angles to each other. Thus in most instances the bottom layer 21 has the diamonds extending longitudinally, the next higher layer has the major axis of the diamonds extending transversely, and this alternation is continued until the top layer, in the present embodiment which has seven reinforcing layers 21, has the major axis of the diamonds extended longitudinally.

After the carbon insert blocks 23 have been put in place in the mounting openings 22 as will be described in further detail hereinafter, a flanged top cap 24 is put in place over the upper layer 21 of the bundle and this cap 24 is made from expanded metal and has side flanges 24F that extend for a short distance downwardly along the sides of the bundle, as will be evident particularly in Figs. 3 and 4 of the drawings. It should be pointed out that in practice the assembly of the layers 21, the insertion of the carbon insert blocks 23, and the mounting of the cap 24 on the bundle is accomplished while the layers 21 and the cap 24 are in a relatively flat condition, and while this flat condition of the various metal elements is maintained, the cap 24 and the reinforcing layers 21 are secured together by metal ties or bands 25 that are of a conventional type which, after tightening, are held in tightened relationship by means of a securing member 25S. This conventional metal strapping is known in the trade as Acme Steel Strapping, or as Signode Steel Strapping. After the reinforcing bundle 20 has been thus assembled, the bundle is bent to a radius or arcuate form that conforms with the particular brake shoe in which the reinforcing bundle is to be used.

Under and in accordance with the present invention, the reinforcing layers 21 are formed as shown in Fig. 10 with the openings 22 embodied as laterally opening slots so that each of these slot-like openings 22 opens laterally through one of the side edges of the elongated piece of expanded metal that forms the reinforcing layer. In Fig. 10 of the drawings, the width of one of the slot-like openings 22 is indicated by the letter "W," and under the present invention this width W of the openings 22 is so related to the corresponding dimensions of the carbon blocks 23 that when the blocks 23 are inserted into the openings 22, the relatively sharp end edges of the expanded metal that defined the openings 22 are firmly engaged and to some extent dig into the sides of the block 23, and this relationship has been illustrated in a diagrammatic way in Fig. 4B of the drawings. In this respect, attention is particularly directed to Figs. 4A and 4B where it will be apparent that the carbon insert blocks 23 are formed with a somewhat trapezoidal cross section, this being desirable to facilitate the original molding of the blocks, and being advantageous in facilitating the mounting of the blocks 23 in the openings 22. It will be observed that in the finished reinforcing bundle 20, the larger end of the blocks 23 is disposed in an uppermost position so as to be located immediately below the cap 24, and this serves as an additional safety factor to insure retention of the blocks 23 in their position of use throughout the entire useful life of the brake shoes in which such reinforcing bundles 20 are employed.

Under the present invention, the carbon insert blocks 23 are mounted or inserted into their interlocked relationship with respect to the layers 21 of the bundle through the use of an assembling machine 30 that is illustrated in Figs. 5 to 9 of the drawings. The assembling machine 30 comprises an elevated work table 31 that is supported in a rigid relationship by a pair of front legs 32F and a pair of rear legs 32R that extend downwardly from the four corners of the table 31 and are connected at their lower ends to an angle iron base or spreader structure 33 that includes a transverse member 33T, as shown in Figs. 5 and 8 of the drawings. Substantially midway between the table 31 and the base 33, the legs 32F and 32R are further connected by an intermediate horizontal spreader structure 34, and in the present instance the several legs and the spreader structures are formed for convenience from angle iron elements that are connected together in a conventional manner as by welding.

On the table 31, means are afforded for supporting and positioning a stack 21S, Fig. 10, of reinforcing layers 21, and for positioning and subsequently moving carbon insert blocks 23 into the slots 22 that are formed in this stack 21S. Thus as shown in Figs. 5 to 8, a work positioning station is defined on the table 31 by a plurality of side blocks 35 and a pair of end blocks 36 that are fixed in position on the table top to define a rectangular work-receiving pocket in which a stack 21S may be disposed as shown in Fig. 6. The end blocks 36 are arranged to rather snugly engage the ends of the stack 21S, while the said blocks 35 are formed with sloping edges on their adjacent faces so as to facilitate downward movement of the stack 21S into the work receiving pocket that is thus defined. Particular attention is directed to the arrangement of the side blocks 35 as shown in Figs. 6 and 7 whereby these blocks 35 are spaced endwise from each other to define block-receiving and guiding pockets or slots 37 in which the carbon insert blocks 23 may be primarily located opposite the slots 22 that are formed in the stack 21S. The blocks 35 are accordingly so spaced that the positioning pockets or slots 37 are disposed opposite the locations of the openings 22 of the stack 21S, and the blocks 35 are preferably so formed that the side walls of the slots 37 are sloped downwardly at substantially the same slope as the sides of the carbon insert blocks 23.

In the use of the machine 30, the stack 21S is put in position in the work receiving pocket defined by the blocks 35 and 36 and carbon insert blocks 23 are disposed in all of the slots 37. The stack 21S is then clamped downwardly within the work receiving pocket, and while the stack 21S is thus clamped, the several carbon insert blocks 23 are forced laterally into the slot-like openings 22 on opposite sides of the stack 21S. The machine 30 proves power means for accomplishing such clamping and block inserting operation. Thus, as shown in Figs. 5 to 9 of the drawings, an upper clamping platen 40 is suspended by means of a pivot rod 41 from the forward ends of a pair of supporting levers 42 so that the clamping platen 40 may be brought downwardly over the work supporting pocket and into engagement with the upper faces of the blocks 35 and 36, and when thus positioned an extension block 40B on the lower face of the platen 40 extends for a short distance downwardly into the work receiving pocket to apply the desired clamping forces to the stack 21S. The supporting levers 42 extend rearwardly beyond the rear edge of the table 31, and intermediate the ends thereof and adjacent the center of the table 31, these levers 42 are supported for rocking movement on a horizontal shaft 43 that is, in turn, carried on a pair of upstanding brackets 44 secured to the top of the table 31. The rear ends of the levers 42 are connected by a cross rod 45 to which the forces for operating the clamping platen 40 are applied. Such forces in the present instance are obtained through the use of a double acting piston and cylinder device 46 having the extended end of its piston rod 46R pivotally connected by means of a yoke 47 to the cross rod 45. The piston cylinder device 46 has its cylinder 46C provided with a pivotal mounting lug 48 on the lower end thereof, and this mounting lug 48 is pivotally secured to the spreader structure 34 by means including a pivot 49 as indicated in Fig. 5 of the drawings.

The piston and cylinder device 46 is controlled through the use of a conventional four-way valve 50 mounted on an angle bracket 51 secured to the right hand end of the table as shown in Figs. 6 and 8, and this valve 50 has the usual pressure fluid connections including a supply pipe 52 from a suitable source of pressure fluid such as compressed air, and independent lines or pipes 53 and 54 extended from the output side of the valve 50 to the opposite ends of the cylinder 46C. Thus, by operation of the valve 50, the clamping platen 40 may be moved back and forth between its upper retracted position that is shown in dotted outline on Fig. 5 and its lower effective or clamping position as shown in full lines in Fig. 5. In the course of such operation, the arms 42 that support the clamping platen 40 are preferably arranged to operate a swinging safety arm or bar 60 that is disposed above the table 31 and forwardly of the work receiving pocket. Thus, as will be evident in Figs. 5 and 7, the safety bar 60 is supported at its opposite end on the forward ends of a pair of rocking levers 61 that are pivoted intermediate therein on pivots 62 that are mounted in upstanding lugs 62B fixed just outwardly of the respective end blocks 36. Rearwardly of the pivots 62, and at their rear ends, the rocking levers 61 are connected by a cross bar 64 which, as shown in Figs. 5, 7 and 9, extends beneath the platen supporting levers 42 forwardly of their supporting pivot rod 43. The safety rod 60 is made of such a size and weight that it normally tends to assume the lower or ineffective position that is shown in dotted outline in Fig. 5, thus to be located relatively close to the table surface, and when the bar 60 is thus positioned the workmen may readily reach over the bar and perform the necessary loading or unloading operations. When, however, the clamping platen 40 is moved downwardly toward its effective position, the rear portions of the levers 42 engage the cross bar 64 to move the same downwardly to the position shown in full lines in Fig. 5, and as this is done the safety bar 60 moves upwardly, to thereby force the operator's hands away from the path of the clamping platen 40 in the event that the operator has not previously withdrawn his hands from this danger zone.

After the stack 21S has thus been clamped in position in the work receiving pocket, the desired inserting movements are imparted to the several carbon insert blocks 23 that have been previously located in the slots 37, and this is accomplished by a pair of inserting slides 65F and 65R. These inserting slides 65F and 65R are disposed parallel to the front and rear sides of the work-receiving pocket and are slidably supported and guided on a pair of parallel guide rods 66 that are extended through the end blocks 36 and extend both forwardly and rearwardly from these blocks, and the rods 66 are secured in place in the blocks 36 by locating pin 66P. The rods 66 are extended slidably through openings formed in the slides 65R and 65F adjacent to the ends of such slides, as will be evident in Figs. 5 and 6 of the drawings, and thus the inserting slides 65R and 65F may be moved back and forth toward and away from the blocks 35. In such movements, a plurality of work engaging fingers 68 that are mounted on the slides 65F and 65R opposite the slots 37 are moved into and through such slots, thus to engage and push the carbon insert blocks 23 from the slots 37 and into the aligned slot-like openings 22 of the stack 21S.

The working and retracting movements of the slides 65F and 65R are accomplished by power means and for this purpose, a front rock shaft 69F is mounted in brackets 70 on a supporting shelf 71 that is secured on the front legs 32F somewhat below the face of the table 31. A pair of upwardly extending arms 73 are fixed on the rock shaft 69F adjacent to the ends thereof, and these arms 73 extend upwardly to substantially the level of the front slide 65F and are connected thereto at spaced points by links 74. Similarly, a rear rock shaft 69R is mounted between the rear legs 32R and arms 73R are fixed thereto and extended upwardly through clearance slots 31S, Fig. 7, formed in the rear edge of the table 31, and the upper ends of these arms 73R are connected to the rear slide 65R by means of forwardly extending transmitting links 74R.

Thus by imparting rocking movements to the shafts 69R and 69F, the slides 65R and 65F may be moved back and forth through advancing or retracting movements, and this is accomplished by means of a double acting piston and cylinder device 76 that has the lower end of its cylinder 76C pivoted at 76P to the cross bar 33T of the base 33, as will be evident in Figs. 5 and 8 of the drawings. The piston and cylinder device 76 has its piston rod 76R extended upwardly therefrom and connected to a pair of links 77F and 77R, these links each having one end thereof pivoted to the piston rod 76R on a common pivot 77P. The other ends of the links 77F and 77R are connected to adjacent ends of a pair of arms 78F and 78R and these arms are fixed respectively to the rock shafts 69F and 69R as will be evident in Fig. 5 of the drawings. In Fig. 5, the work supporting slides 65F and 65R are illustrated in their retracted positions, and when it is desired to advance these slides and thus force the carbon insert blocks 23 into position in the slots 22, the piston and cylinder device 76 is actuated so as to pull the piston rod 76R downwardly, and a reverse actuation of the piston and cylinder device 76 will produce retracting movement of these slides. The piston and cylinder device 76 is controlled by the conventional four-way valve 80 that is mounted on an angle bracket 81 secured to the left hand end of the table 31, and pressure fluid such as air is supplied from a suitable source by a supply line 82 and is transmitted to one end or the other of the piston and cylinder device 76 by connections 83 and 84 that are extended from the output ports of the valve 80.

The machine 30 that has thus been described may be utilized under the present invention to carry out the novel and advantageous manufacturing process that has been diagrammatically illustrated in Fig. 10 of the drawings.

Thus, the individual reinforcing layers 21 may be produced in a rapid and efficient manner on a punch press 90, while the caps 24 may be formed on a forming press 91 located adjacent to the punch press 90, and the punch press 90 and the forming press 91 are located adjacent to an assembly table 92 upon which the individual reinforcing layers 21 are assembled into stacks 21S. These stacks 21S are then transferred to one or the other of a pair of inserting machines 30, both of which are located adjacent to the assembly table 92, and in these two machines 30 the carbon insert blocks are inserted laterally into the openings 22 of the stack 21S, as hereinabove described, through the use of the machines 30; or may be inserted from the tops of the stacks through the use of machines 130, as will be described hereinafter. Both alternative modes of insertion are illustrated schematically in Fig. 10. Then, while the stack remains in the work supporting position of the machine 30, or 130, in which it has been assembled, the clamping platen 40, or 140, is elevated and the cap 24 is put in position on the top of the assembled stack. The cap may be pressed down onto the stack manually, or if this requires excessive force, the clamping platen may again be operated through a clamping and releasing operation, thus to complete the preliminary assembly of the bundle 20. The bundle is then removed from the work-supporting pocket of the machine in which it has been formed, and is taken to an adjacent strapping machine 93 in which the straps 25 are put in position and tightened about the stack. The bundles are at this time in a flat form, and are transferred to a radius forming press 94 where they are bent to the desired arcuate form as shown in Fig. 1 of the drawings. The bundles 20 are then placed on one of a plurality of stacking racks 95, and are transported on such racks to a dipping tank 96 which contains a refractory mixture into which the stacked bundles 20 are dipped by submersion of the stacking rack 95 in the tank 96. The stacking rack 95 with the stacked and coated bundles 20 thereon is then transported to a dryer 97, where the liquid component of the refractory mixture is evaporated, thus to leave the elements of the bundle 20 protected by a coating of refractory material which, according to conventional practices, serves to protect the metallic elements of the bundle 20 against burning in the course of the casting operation that is subsequently performed when the bundles are cast into carbon insert brake shoes of the character disclosed in the aforesaid Wilson patents.

In the previously described machine 30 for inserting the carbon insert blocks 23 into the openings 22, the inserting movement has been lateral in character and into the open ends of these slot-like openings 22. Such insertion of the blocks 23 may, however, be accomplished by a downward movement of these blocks, and in Figs. 11 to 14 of the drawings, an alternative inserting machine 130 has been illustrated for accomplishing the inserting operation in this manner. Thus the machine 130 has a table 131 supported by legs 132F and 132R, and the table is provided with a plurality of blocks 135 and 136 which define a work receiving pocket of the same general form and arrangement as hereinbefore described. A stack 21S of reinforcing layers 21 is placed in this pocket, and the carbon insert blocks 23 are, in this instance, positioned above the slots 22 by partially dropping or forcing the smaller lower ends of the blocks 23 into these openings 22. The blocks 23 are then forced downwardly into the openings 22 by means of a platen 140 that is suspended on a pivot rod 141 that extends between the forward ends of a pair of supporting levers 142. These supporting levers are carried on a pivot rod 143 that is, in turn, mounted in mounting brackets 144 carried on the table 131 near the rear edge thereof. The platen 140 may be operated in the same manner as the platen 40 hereinbefore described. In this embodiment of the invention, an ejecting plunger 240 is mounted on what amounts to an upward extension of the piston rod 76R, and the piston and cylinder device 76 may thus be operated to impart an upward ejecting movement to the plunger 240 thus to eject the assembled stack 21S from the work receiving pocket. In this embodiment, arms 178F and 178R mounted on rock shafts 169F and 169R, are connected by links 177F and 177R to the upper end of the rod 76R, and these elements thus serve as a guiding means for the upper end of the rod 76R.

From the foregoing description it will be apparent that an interlocked fit is afforded between the carbon insert blocks and the sharp edges of the metal that define the slots 22, and this interlock holds the insert blocks securely within the slots 22 and against the cap 24 so as to be additionally restrained against lateral displacement by the action of the side flanges 24F of the cap, and because of this relationship, the location of the carbon insert blocks in these slots is, to all intents and purposes, permanent in character. It will also be evident that the assembly of the blocks and the expanded metal parts with this permanent inter-relationship is rendered possible through the use of the assembling machines that are afforded under the present invention. Moreover, it will be evident that the attainment of such a permanent positioning of the carbon insert blocks in the stacks of expanded metal makes possible the completion of the bundles 20 at the plant where the expanded metal is originally made and cut to form. Hence all of the related operations involved in the production of the expanded metal bundles 20 up to and including the application of the refractory material thereto, may be performed at the metal working plant, and the completely formed bundles may then be transported to the foundry in which the bundles are to be finally cast into brake shoes under the aforesaid Wilson patents. This, of course, materially simplifies the work that must be performed in the molding room of the foundry, and as a result, it has been found that the carbon insert railway brake shoes of the kind disclosed in the aforesaid Wilson patents may be manufactured with greater uniformity and more economically than has heretofore been possible.

Thus, while we have illustrated and described the preferred embodiments of our invention, it is to be understood that these are capable of variation and modification, and we therefore do not wish to be limited to the practice details set forth but desire to avail ourselves of such changes and alterations as fall within the purview of the following claims:

We claim:

1. In a reinforcing bundle adapted to be cast into a railway brake shoe, a plurality of elongated rectangular pieces of expanded metal arranged in face to face relation in a stack and having aligned cut-out openings formed therein at spaced point throughout the area thereof and defined by cut edges of the expanded metal, a plurality of insert blocks of a friction modifying material formed with lateral dimensions slightly exceeding the dimensions of said cut-out openings, and forced into said openings to mechanically interlock said cut edges of the expanded metal with said blocks, and means securing said pieces of expanded metal together to form a unitary bundle.

2. In a reinforcing bundle adapted to be cast into a railway brake shoe, a plurality of elongated rectangular pieces of expanded metal arranged in face to face relation in a stack and having aligned cut-out openings formed therein at spaced points throughout the area thereof and defined by cut edges of the expanded metal, a plurality of insert blocks of a friction modifying material of tapered form with lateral dimensions slightly exceeding the dimensions of said cut-out openings, and said blocks being forced into said openings with the large ends adjacent one face of the stack to mechanically interlock said cut edges of the expanded metal with said blocks, a cap formed of expanded metal disposed on said one face of said stack, and means securing said pieces of expanded metal together to form a unitary bundle.

3. In a reinforcing bundle adapted to be cast into a railway brake shoe, a plurality of elongated rectangular pieces of expanded metal arranged in face to face relation in a stack and having aligned cut-out openings formed therein at spaced points throughout the area thereof so as to constitute laterally opening slots and defined by cut edges of the expanded metal, a plurality of insert blocks of a friction modifying material formed with lateral dimensions slightly exceeding the dimensions of said cut-out openings and forced into said openings to mechanically interlock said cut edges of the expanded metal with said blocks, a cap formed from sheet metal and disposed on one face of said stack to engage one end of each of said blocks, side flanges formed on said cap and extending along the sides of said stack to partially close the ends of the slots formed by said openings, and means securing said pieces of expanded metal together to form a unitary bundle.

4. In a reinforcing bundle adapted to be cast into a cast iron railway brake shoe, a plurality of elongated rectangular pieces of expanded metal arranged in face to face relation in a stack and having aligned cut-out openings formed therein at spaced points throughout the area thereof, to afford laterally opening slots in opposite sides of the stack and defined by cut edges of the expanded metal, a plurality of insert blocks of a friction modifying material of tapered form and with lateral dimensions slightly exceeding the dimensions of said cut-out openings, said blocks being forced into said openings with the larger ends disposed at one face of said stack, to mechanically interlock said cut edges of the expanded metal with said blocks, a cap formed from expanded metal disposed against said face of said stack and having edge flanges partially closing the open ends of said slots, and means securing said pieces of expanded metal together to form a unitary bundle.

5. In a machine for assembling reinforcing bundles that are adapted to be cast into cast iron railway brake shoes, said machine comprising a work table, locating means on said work table defining a work-receiving pocket adapted to receive a stack of pieces of expanded sheet metal disposed in face to face relation and having aligned cut-out openings formed in such pieces and defined by cut edges of the expanded metal, and means on said table operable through a working stroke to force a plurality of insert blocks into said openings simultaneously and into interlocked relation with the cut edges defining such openings.

6. In a machine for assembling reinforcing bundles that are adapted to be cast into railway brake shoes, said machine comprising a work table, locating means on said work table defining a work-receiving pocket adapted to receive a stack of pieces of expanded sheet metal disposed in face to face relation and having aligned cut-out openings formed in such pieces and defined by cut edges of the expanded metal, and clamping platen on said table operable through a working stroke to force a plurality of insert blocks downwardly into said openings simultaneously and into interlocked relation with the cut edges defining such openings.

7. In a machine for assembling reinforcing bundles that are adapted to be cast into cast iron railway brake shoes, said machine comprising a work table, locating means on said work table defining a work-receiving pocket adapted to receive a stack of pieces of expanded sheet metal disposed in face to face relation and having aligned cut-out openings formed in such pieces and defined by cut edges of the expanded metal, a clamping platen on said table operable through a working stroke to force a plurality of insert blocks into said openings simultaneously and into interlocked relation with the cut edges defining such openings, and an ejector movable into said pocket to eject a stack of such pieces from such pocket.

8. In a machine for assembling reinforcing bundles that are adapted to be cast into cast iron railway brake shoes, said machine comprising a work table, locating means on said work table defining a work-receiving pocket adapted to receive a stack of pieces of expanded sheet metal disposed in face to face relation and having aligned cut-out laterally opening slots formed in such pieces with such slots defined by cut edges of the expanded metal, said locating means being formed with open-topped positioning and guiding grooves aligned with the positions to be occupied by such slots and adapted to have insert-blocks positioned in such grooves, a clamping platen for clamping a stack of such sheets in said pocket, and inserting slides having elements movable in said grooves toward said pocket for forcing such blocks into the slots of such a stack in interlocked relation to the cut edges of the slots of such a stack.

9. In a machine for assembling reinforcing bundles that are adapted to be cast into railway brake shoes, said machine comprising a work table, locating means on said work table defining a work-receiving pocket adapted to receive a stack of pieces of expanded sheet metal disposed in face to face relation and having aligned cut-out laterally opening slots formed in such pieces and defined by cut edges of the expanded metal, said locating means being formed with positioning and guiding grooves aligned with the positions to be occupied by such slots and adapted to have insert-blocks positioned in such grooves, a clamping platen for clamping a stack of such sheets in said pocket, inserting elements movable in said grooves toward said pocket for forcing such blocks into the slots of such a stack in interlocked relation to the cut edges of the slots of such a stack, and means for operating said inserting elements in unison.

10. In a machine for assembling reinforcing bundles that are adapted to be cast into railway brake shoes, said machine comprising a work table, locating means on said work table defining a work-receiving pocket adapted to receive a stack of pieces of expanded sheet metal disposed in face to face relation and having aligned cut-out laterally opening slots formed in such pieces and defined by cut edges of the expanded metal, said locating means being formed with open-topped positioning and guiding grooves aligned with the positions to be occupied by such slots and adapted to have insert-blocks positioned in such grooves, releasable means for holding a stack of such sheets in said pocket, and inserting elements movable in said grooves toward said pocket for forcing such blocks into the slots of such a stack in interlocked relation to the cut edges of the slots of such a stack.

11. In a machine for assembling reinforcing bundles that are adapted to be cast into railway brake shoes, said machine comprising a work table, locating means on said work table defining a work-receiving pocket adapted to receive a stack of pieces of expanded sheet metal disposed in face to face relation and having aligned cut-out laterally opening slots formed in such pieces and defined by cut edges of the expanded metal, said locating means being formed with positioning and guiding grooves aligned with the positions to be occupied by such slots and adapted to have insert-blocks positioned in such grooves, releasable means for holding a stack of such sheets in said pocket, and inserting means movable in said grooves toward said pocket for forcing such blocks into the slots of such a stack in interlocked relation to the cut edges of the slots of such a stack.

12. In a machine for assembling reinforcing bundles that are adapted to be cast into railway brake shoes, said machine comprising a work table, locating means on said work table defining a work-receiving pocket adapted to receive a stack of pieces of expanded sheet metal disposed in face to face relation and having aligned cut-out laterally opening slots formed in such pieces and defined by cut edges of the expanded metal, guiding means for guiding insert-blocks into such slots, releasable means for holding a stack of such sheets in said pocket, and inserting means movable with respect to said guiding means for forcing such blocks into the slots of such a stack of interlocked relation to the cut edges of the slots of such a stack.

13. In the production of cast iron railway brake shoes having blocks of friction modifying material disposed within the expanded metal reinforcing bundle thereof, the method that consists in forcing oversize blocks of friction modifying material into aligned cut-out openings in a stack of expanded sheet metal to interlock the blocks with the cut edges of such openings, and securing said sheets together to form a bundle for insertion as unit into a brake shoe mold.

14. In the production of cast iron railway brake shoes having blocks of friction modifying material disposed within the expanded metal reinforcing bundle thereof, the method that consists in forcing oversize blocks of friction modifying material into aligned cut-out openings in a stack of expanded sheet metal to interlock the blocks with the cut edges of such openings, securing said sheets together to form a bundle, and subsequently bending the bundle to arcuate form to fit the same for insertion as a unit into a brake shoe mold.

15. In the production of cast iron railway brake shoes having blocks of friction modifying material disposed within the expanded metal reinforcing bundle thereof, the method that consists in forming elongated pieces of expanded metal with laterally opening slots opening alternately through the opposite side edges of such pieces, arranging a plurality of such pieces in a stack with said openings in alignment, forcing oversize blocks of friction modifying material into aligned cut-out openings in a stack of expanded sheet metal to interlock the blocks with the cut edges of such openings, placing a cap of expanded metal over said stack with side flanges on said cap overlapping portions of the exposed side faces of such blocks, and securing said cap and said sheets together to form a bundle.

16. In the production of cast iron railway brake shoes having blocks of friction modifying material disposed within the expanded metal reinforcing bundle thereof, the method that consists in forming elongated pieces of expanded metal with laterally opening slots opening alternately through the opposite side edges of such pieces, arranging a plurality of such pieces in a stack with said openings in alignment, forcing oversize blocks of friction modifying material into the open ends of the aligned cut-out slots in a stack of expanded sheet metal to interlock the blocks with the cut edges of such openings, placing a cap of expanded metal over said stack with side flanges on said cap overlapping portions of the exposed side faces of such blocks, and securing said cap and said sheets together to form a bundle.

17. In the production of cast iron railway brake shoes having blocks of friction modifying material disposed within the expanded metal reinforcing bundle thereof, the method that consists in forming elongated pieces of expanded metal with laterally opening slots opening alternately through the opposite side edges of such pieces, arranging a plurality of such pieces in a stack with said openings in alignment, forcing oversize blocks of friction modifying material into aligned cut-out openings in a stack of expanded sheet metal to interlock the blocks with the cut edges of such openings, placing a cap of expanded metal over said stack with side flanges on said cap overlapping portions of the exposed side faces of such blocks, securing the cap and the sheets together to form a bundle, forming the bundles to an arcuate shape, dipping said bundles in refractory material, and subjecting the dipped bundles to a drying operation to condition such bundles for insertion as a unit into a brake shoe mold.

References Cited in the file of this patent

UNITED STATES PATENTS

| | | |
|---|---|---|
| 1,728,172 | Bendix | Sept. 17, 1929 |
| 1,910,507 | Stoner | May 23, 1933 |
| 2,011,661 | Spinosa | Aug. 20, 1935 |
| 2,048,276 | Marlies | July 21, 1936 |
| 2,139,876 | Bullington | Dec. 13, 1938 |
| 2,668,348 | Hubbell | Feb. 9, 1954 |